United States Patent [19]

Kamiyama

[11] Patent Number: 4,591,746

[45] Date of Patent: May 27, 1986

[54] IGNITION SIGNAL GENERATOR FOR INTERNAL COMBUSTION ENGINES

[75] Inventor: Takaki Kamiyama, Katsuta, Japan

[73] Assignee: Hitachi, Ltd., Tokyo, Japan

[21] Appl. No.: 719,294

[22] Filed: Apr. 3, 1985

[30] Foreign Application Priority Data

Apr. 4, 1984 [JP] Japan .................................. 59-65775

[51] Int. Cl.$^{4}$ .............................................. H02K 11/00

[52] U.S. Cl. .............................. 310/70 A; 123/149 R; 123/149 E

[58] Field of Search .................... 310/70 A, 70 R, 154, 310/156, 261, 254; 123/149 R, 149 D, 149 C, 148 E; 322/91; 315/209, 218

[56] References Cited

U.S. PATENT DOCUMENTS

| | | | |
|---|---|---|---|
| 3,715,650 | 2/1973 | Draxler | 310/70 R X |
| 3,799,137 | 3/1974 | Reddy | 123/149 R |
| 3,828,754 | 8/1974 | Carlsson | 310/70 R X |
| 4,019,485 | 4/1977 | Carlsson | 310/70 A X |
| 4,328,439 | 5/1982 | Adler et al. | 310/70 R |
| 4,463,715 | 8/1984 | Brammer | 310/70 A X |

*Primary Examiner*—Mark O. Budd

*Attorney, Agent, or Firm*—Antonelli, Terry & Wands

[57] ABSTRACT

'The invention is concerned with an ignition signal generator for internal combustion engines, consisting of a rotor and stators, wherein the rotor is constituted by a cylindrical magnet magnetized in the axial direction, and two disc-like magnetic pole pieces consisting of N pole and S pole attached to both side surfaces of the cylindrical magnet, the stators are so disposed that the two magnetic pole pieces are sandwiched therebetween, one end of each of the stators being faced to the N pole of the magnetic pole pieces and the other end thereof being faced to the S pole, and a pulser coil is wound on the central portion. Each of the two disc-like magnetic pole pieces is provided with stepped portions consisting of a portion larger than the outer diameter of the cylindrical magnet and a portion smaller than the outer diameter of the cylindrical magnet, the stepped portions in the periphery of the two magnetic pole pieces being coupled by a curve that changes gradually.

9 Claims, 10 Drawing Figures

IGNITION SIGNAL GENERATOR FOR INTERNAL COMBUSTION ENGINES

FIELD OF THE INVENTION

The present invention relates to an ignition signal generator for internal combustion engines, and more specifically to an ignition signal generator for internal combustion engines that can be adapted to a rotating-field magneto generator.

According to a known device disclosed, for example, in U.S. Pat. No. 3,799,137, magnets are cylindrically fastened to a shaft that rotates with the rotation of an internal combustion engine, outputs are produced on a pulser that is firmly arranged along the outer periphery thereof by disc-like magnetic poles that move together with the magnets, and an ignition circuit is controlled by the outputs.

In the above device, however, semi-circular permanent magnets that work as a source of excitation are magnetized in a radial direction, opposed to each other, and are arranged to form a cylinder. Further, the disc-like magnetic pole piece is arranged on only one side surface to energize the pulser. Moreover, a magnetic pole piece having a shape nearly equal to the semi-circular magnet is overlapped on only one side surface to form a gap between the N pole and the S pole, so that the magnetic flux induced in the pulser coil is inverted by the gap, and that a normal ignition signal is generated by the pulser coil at a central portion along the periphery of each of the magnetic pole pieces where the magnetic flux of the N and S poles is maximal. In this case, however, the pulser coil generates a noise signal of the same phase as the normal ignition signal at a moment when the magnetic flux induced in the pulser coil is inverted by the gap at a moment after the normal ignition signal is generated but before another normal ignition signal is generated. Therefore, erroneous operation results at the moment of ignition.

From the viewpoint of construction, furthermore, the semi-circular magnets require a relatively cumbersome assembling and magnetizing operation. Also since the magnets must be coupled with strong force, reliability tends to decrease.

According to another conventional ignition signal generator for internal combustion engines disclosed in U.S. Pat. No. 3,715,650, semi-circular magnets that are magnetized in the axial direction, are arranged in a cylindrical form, magnetic pole pieces having a shape nearly equal to the semi-circular magnets are overlapped on both side surfaces thereof to form a gap between the N pole and the S pole, and the magnetic flux in the pulser poles is changed by the gap to take out the ouptus from the pulser. However, this device has defects similar to those of the aforementioned U.S. Pat. No. 3,799,137, and is further complex in construction since it uses two semi-circular magnets. Moreover, four additional magnetic pole pieces are required, that are split in two. Therefore, the construction is such that it has little resistance to centrifugal force when running at high speed, a serious disadvantage in practical use.

SUMMARY OF THE INVENTION

The object of the present invention is to provide an ignition signal generator for internal combustion engines, which is capable of producing a signal voltage with little erroneous ignition.

To achieve the above-mentioned object according to the present invention, the ignition signal generator for internal combustion engines is constituted using a rotor and stators to be described later in detail. The rotor is constituted by a cylindrical magnet magnetized in the axial direction, and two disc-like magnetic pole pieces consisting of N pole and S pole attached to both side surfaces of the cylindrical magnet, the stators are so positioned that the two magnetic pole pieces are sandwiched therebetween, one end of each of the stators being faced to the N pole of the magnetic pole pieces and the other end thereof being faced to the S pole, and a pulser coil is wound on the central portion. Here, what is more important is that each of the two disc-like magnetic pole pieces is provided with stepped portions consisting of a portion larger than the outer diameter of the cylindrical magnet and a portion smaller than the outer diameter of the cylindrical magnet, the stepped portions in the periphery of the two magnetic pole pieces being coupled by a curve that changes gradually.

Therefore, the change in the magnetic flux is very slow in the portion where the pulser coil approaches the portion in which the outer periphery of the magnetic pole pieces gradually changes accompanying the turn of the rotor, and where the magnetic flux induced in the pulser coil is inverted. Therefore, among the voltage waveforms generated at that moment, an output voltage having a polarity the same as that of a normal ignition signal can be prevented from being generated.

According to the present invention, therefore, erroneous operation of the pulser can be eliminated, that is, erroneous operation that stems from a noise signal having a polarity the same as that of a normal ignition signal generated at normal ignition timing, that was inherent in the conventional ignition signal generators for internal combustion engines.

DETAILED DESCRIPTION OF THE PREFERRED EMBODIMENT

Figure 1:
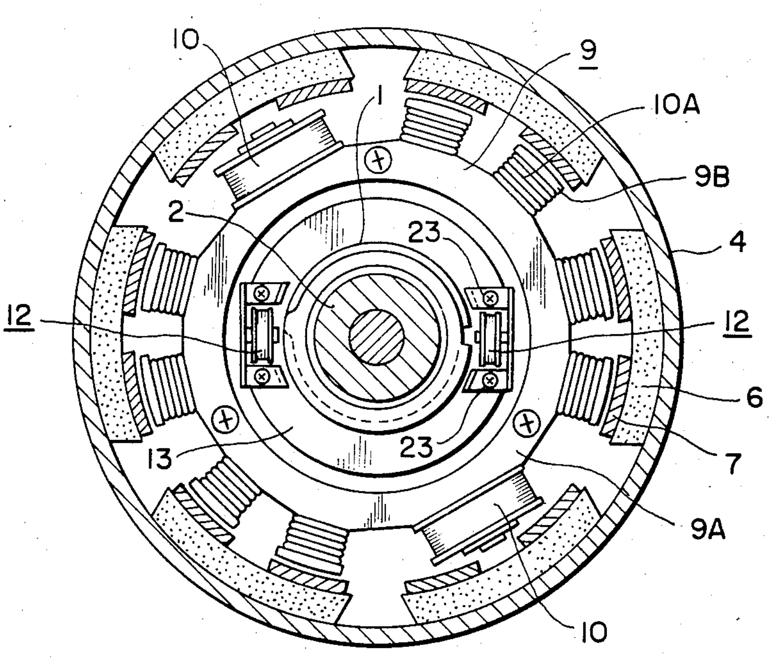
FIG. 1 is a front section view of a magneto generator equipped with an ignition signal generator of the present invention.
Figure 2:
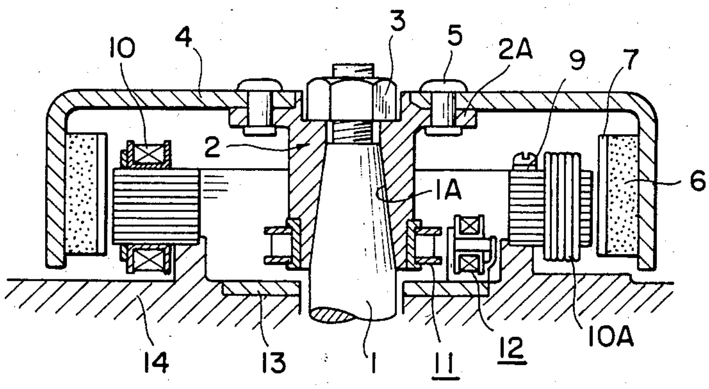
FIG. 2 is a vertical section view of a magneto generator shown in FIG. 1.

Referring to FIGS. 1 and 2, reference numeral 1 denotes a drive shaft of an internal combustion engine. To the tapered portion 1A at the end of the drive shaft is fastened a cylindrical center piece 2 by a nut 3. To a flange portion 2A of the center piece 2 is riveted as designated at 5 the central bottom portion of a cup-like fly-wheel 4 which is made of steel.

Permanent magnets 6 that are magnetized in the radial direction are arranged along the inner peripheral surface of the fly-wheel 4 to constitute alternately different polarities. Further, two magnetic pole pieces 7 are attached to the inner peripheral surface of each permanent magnet 6 maintaining a gap in the direction of rotation. A stator 9 is mounted concentrically with an engine case 14 being opposed to the inner peripheral surfaces of the permanent magnets 6 maintaining a small gap therebetween. The stator 9 consists of an annular core 9A having a plurality of magnetic poles 9B which are radially formed and on which are separately wound coils 10 for electrically charging the storage battery and coils 10A that serve as a power source for the ignition system. The fly-wheel 4, center piece 2, and pulser rotor 11 rotate together as a unitary structure.

Figure 3:
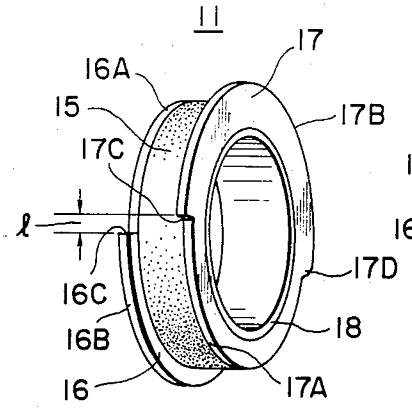
FIG. 3 is a perspective view of a pulser rotor.
Figure 5:
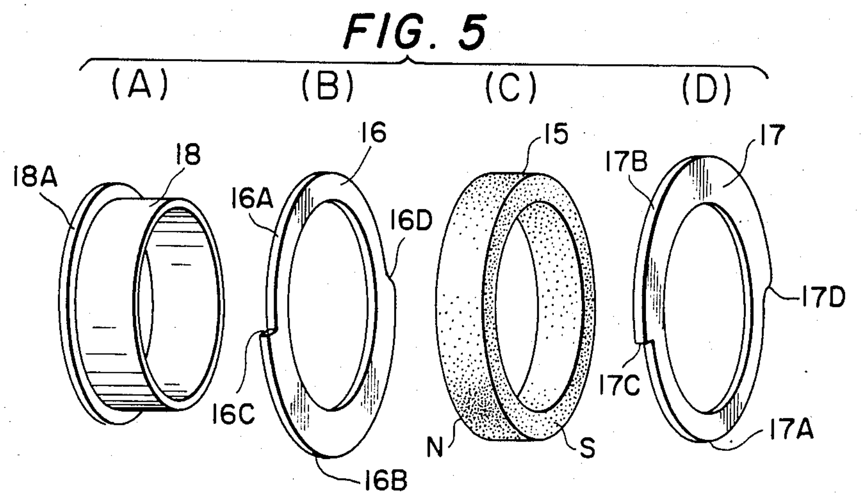
FIG. 5 is a perspective view showing the pulser rotor of FIG. 3 in a disassembled manner.

On the outer periphery of the center piece 2 is formed the pulser rotor 11 which is constructed as shown in FIG. 3 and which produces ignition signals. Stators 12 are disposed via a base 13 to oppose to the rotor 11, and are secured to the engine case 14. The pulser rotor 11 consists, as shown in FIG. 5, of nearly disc-shaped magnetic pole pieces 16, 17 that are attached to both side surfaces of a cylindrical magnet 15 that is magnetized in the axial direction, and that are fitted onto a boss 18 which is made of a nonmagnetic metal and which has a positioning flange 18A at one end thereof, the boss 18 serving as an axis thereof. The magnetic pole pieces 16, 17 have, on the peripheries thereof, small circular portions 16A, 17A with a diameter nearly equal to the outer diameter of the cylindrical magnet 15, and large circular portions 16B, 17B protruded over a range slightly wider than the semi-circle. Steeply stepped portions 16C, 17C are formed on one side to connect the large circle and the small circle, and stepped portions 16D, 17D are formed on the other side where the large and small circles are connected with a semi-circle which is nearly equal to the height of the stepped portions. The stepped portions 16D, 17D are formed at positions away from the stepped portions 16C, 17C by 180 degrees in terms of the rotational angles.

The magnetic pole pieces 16, 17 are arranged in such a manner that the stepped portions 16C, 17C are opposed to each other maintaining a small gap l in the axial direction (FIG. 3). On the side of the stepped portions 16D, 17D, however, the magnetic pole pieces 16, 17 are overlapped in the axial direction. In FIG. 5, furthermore, the magnetic pole piece 16 is fitted onto the boss 18 which has a flange 18A to restrict the movement in the axial direction. Then, the cylindrical magnet 15 is fitted thereon followed by another magnetic pole piece 17, thereby to constitute the pulser rotor. These parts are intimately joined with an adhesive agent.

Figure 6:
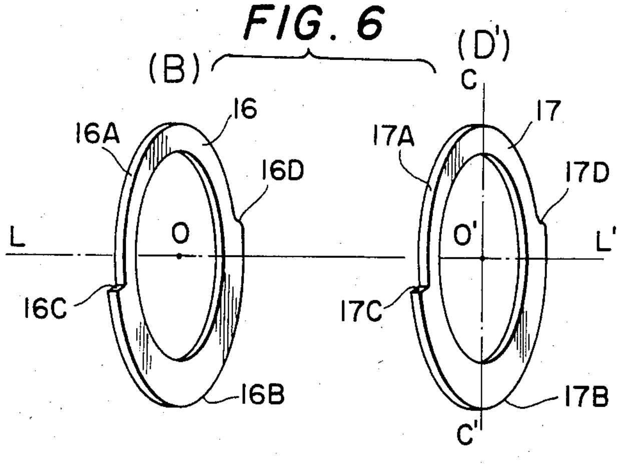
FIG. 6 is a perspective view for explaining the arrangement of disc-like magnetic pole pieces shown in FIG. 3.

FIG. 6 illustrates the relation between the magnetic pole piece 16 and the magnetic pole piece 17.

Figure 8:
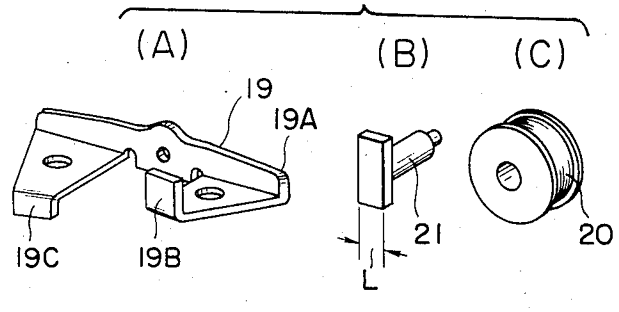
FIG. 8 is a perspective view showing the disassembled pulser stator of FIG. 7.
Figure 9:
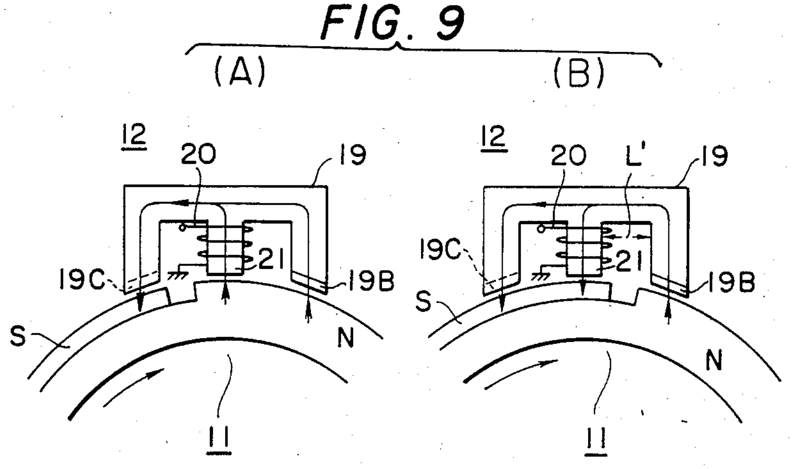
FIG. 9 is a view explaining the magnetic circuit of a pulser core.

The magnetic pole pieces 16, 17 consist of flat plates having the same radius, i.e., having the same maximum radius at the stepped portions 16C, 17C. The magnetic pole pieces 16, 17 are arranged in a state in which they are turned relative to each other by about 180° about a line C—C′ that passes through the center axis L—L′, i.e., arranged in a state as shown in FIG. 3. Here, a gap l is formed between the stepped portions 16C and 17C in FIG. 3. The gap l, however, may not be provided. Furthermore, the stepped portions 16C, 17C may be overlapped in the axial direction. When the stepped portions 16C, 17C are to be overlapped in the axial direction, however, the overlapping length l must establish a relation $l \leqq L$, where L denotes the length of a center part 21 of the core protruded in the axial direction as shown in FIG. 8. As for the size l′ of the overlapping portion of stepped portions 16D, 17D, furthermore, it is necessary to maintain a relation $l' \geqq L'$, where L′ denotes a gap between a center pole piece 21 and either one of the pole pieces 19B or 19C of the stator 12 which is shown in FIG. 9.

Figure 7:
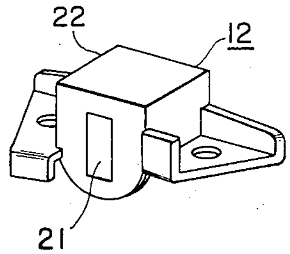
FIG. 7 is a perspective view of a pulser stator.

Referring to FIGS. 7 and 8, a stator core 19 is obtained by punching a magnetic steel plate nearly in a U-shape as shown in FIG. 8A. That is, the stator core 19 has a base portion 19A that is folded upright, and a portion 19B that is folded in the same direction as above, as well as an end portion 19C folded in the opposite direction, whereby to form magnetic pole pieces as a unitary structure. Between the magnetic pole pieces 19B and 19C is inserted a T-shaped center magnetic pole piece 21 which holds a cylindrical pulser coil 20 at the center thereof, and the stator core 19 is secured to the end portion of the center magnetic pole piece 21. The pulser coil 20 which is a constituent element is wrapped with a synthetic resin as shown in FIG. 7, and only the end of the magnetic pole piece 21 is exposed. The magnetic pole piece 21 has a width which is nearly equal to the width for mounting the disc-like magnetic pole pieces 16, 17.

The stators 12 are secured by screws 23 onto the upper surface of the base 13 as shown in FIGS. 1 and 2, and the magnetic pole pieces 19B, 19C, 20C are opposed in an E-shape to the outer periphery of the pulser rotor 11.

Figure 4:
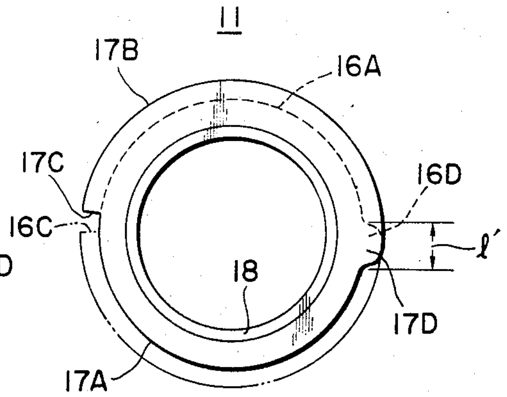
FIG. 4 is a front view of the pulser rotor shown in FIG. 3.
Figure 10:
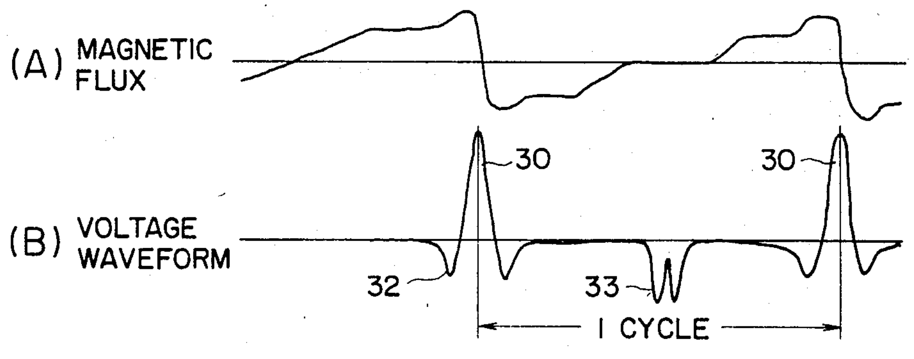
FIG. 10 is a diagram showing magnetic flux waveforms and voltage waveforms of the pulser.

FIG. 9A shows the state where the fly-wheel and the pulser rotor 11 are rotated accompanying the rotation of the engine, and the N pole approaches the pole piece 19B of the stator core 19 and the center magnetic pole piece 21, and the S pole approaches the pole piece 19C. This state then shifts to the state where the S pole approaches the center magnetic pole piece 21 as shown in FIG. 9B. Then, there takes place a steep change in the magnetic flux in the pulser coil 20, and an output voltage is produced by the pulser coil 20. The voltage changes as shown in FIG. 10B responsive to the change in the magnetic flux shown in FIG. 10A. That is, in addition to a normal ignition signal voltage 30 induced in the pulser coil 20 at the time when the magnetic pole piece 21 of the pulser stator 12 has arrived at the stepped portions 16C, 17C, there is produced an output 33 of a different phase in the form of two pulses at the time when the magnetic flux is inverted from the negative polarity to the positive polarity as shown in FIG. 10A being caused by the pulser coil 20 that has arrived at the stepped portions 16D, 17D. The voltage that is generated at the stepped portions 16D, 17D is as sharp as the voltage that is generated at the stepped portions 16C, 17C. When a gap l is maintained between the corresponding stepped portions, the voltage also is generated as a positive noise voltage having the same intensity as the negative small voltage 32 at a position one-half cycle from that of the negative small voltage 32. According to the present invention, however, the stepped portions 16D, 17D are formed in a rounded shape as shown in FIG. 4. Therefore, the magnetic flux changes so slowly that generation of a noise voltage having the same polarity as the normal ignition signal can be suppressed to a small value.

The embodiment of FIGS. 3 to 6 has dealt with the case where there are provided second stepped portions 16D, 17D. However, it is also possible to form a gradually changing curve on the peripheries of the disc-like magnetic pole pieces 16, 17 that contain the first stepped portions 16C, 17C, instead of forming the second stepped portions 16D, 17D, to obtain output waveforms same as those of FIG. 10.

The embodiment of FIG. 9 has dealt with the case where the pulser stator was formed in an E-shape. According to the present invention, however, either one of the magnetic pole piece 19B or 19C may be omitted; i.e., the pulser stator of a U-shape may be employed.

According to the aforementioned embodiment of the present invention, high noise output is not supplied to the gate thyristor in the ignition circuit of the capacitor charge/discharge type, and no erroneous operation develops even at high speeds. High tension is generated in the ignition coil relying only upon the normal signal voltage 30, and ignition energy is reliably generated up through high engine speeds.

According to the present invention, furthermore, the pulse rotor 11 is constituted by a simply constructed cylindrical magnet 15, and disc-like magnetic poles 16, 17. Therefore, the pulse rotors can be assembled and produced highly efficiently, yet making it possible to freely adjust the gap l between the magnetic poles.

The above-mentioned parts are all formed in annular shapes and are arranged concentrically with the boss 18 that serves as an axis. Therefore, the pulse rotor exhibits stable strength even against the centrifugal force produced at high speeds, and offers increased reliability.

What we claim is:

1. In an ignition signal generator for internal combustion engines comprising:

a main generator consisting of a cup-like fly-wheel 4 which rotates accompanying the turn of an internal combustion engine and which has a plurality of field magnets 6 attached to the inner peripheral surface thereof, and a stator 9 which is so arranged as to oppose to said field magnets 6; and a signal generator consisting of a centerpiece 2 which is disposed at the central portion of said fly-wheel 4 and which has had magnets 11 attached to the periphery thereof to excite the pulser, and stators 12 that are provided in an opposing manner on the outside of said pulser-exciting magnets 11 maintaining a gap relative thereto;

wherein said signal generator is comprised of:

a rotor 11 which consists of a cylindrical magnet 15 magnetized in the axial direction, and two disc-like magnetic pole pieces 16, 17 that are attached to both side surfaces of said magnet 15 and that constitute the N pole and the S pole; and stators 12 which are so disposed that said magnetic pole pieces 16, 17 are sandwiched therebetween, and which have a pulser coil 20 wound on a central portion 21 of a core 19 of which the one end 19B is opposed to the N pole of said magnetic pole pieces 16, 17 and of which the other end 19C is opposed to the S pole;

and wherein said disc-like magnetic pole pieces 16, 17 have first stepped portions 16C, 17C formed between portions 16B, 17B having a diameter larger than the outer diameter of said cylindrical magnet 15 and portions 16A, 17A having a diameter smaller than the diameter of said portions 16B, 17B, said stepped portions 16C, 17C having such a shape that is coupled by curves 16A, 16B, 17A, 17B which change gradually along the peripheries of said magnetic pole pieces 16, 17.

2. An ignition signal generator for internal combustion engines according to claim 1, wherein said disc-like magnetic pole pieces 16, 17 have said first stepped portions 16C, 17C that are opposed to each other in the axial direction, and second stepped portions 16D, 17D that are overlapped in the axial direction.

3. An ignition signal generator for internal combustion engines according to claim 1, wherein said disc-like magnetic pole pieces 16, 17 have small semi-circular portions 16A, 17A with a diameter nearly equal to the outer diameter of said cylindrical magnet 15, and semi-circular portions 16B, 17B with a diameter larger than the outer diameter of said magnet 15.

4. An ignition signal generator for internal combustion engines according to claim 1, wherein said two magnetic pole pieces 16, 17 assume the form of a disc having the same maximum diameter at said first stepped portions 16C, 17C, and one magnetic pole piece 17 is opposed to the other magnetic pole piece 16 being turned by about 180° about a line C—C′ that passes through a center axis L—L′ of said two magnetic pole pieces 16, 17.

5. An ignition signal generator for internal combustion engines according to claim 1, wherein each of said stators 12 consists of a pole piece 19B opposed to said N pole on the outer periphery of said disc-like magnetic pole pieces 16, 17, a pole piece 19C opposed to said S pole on the outer periphery, and a center pole piece 21 which is between said two pole pieces 19B and 19C and which is opposed to the periphery of said cylindrical magnet, and wherein each of said stators assumes an E-shape with the pulser coil 20 being wound on said center pole piece 21.

6. An ignition signal generator for internal combustion engines according to claim 1, wherein each of said stators 12 consists of a pole piece opposed to said N pole on the outer periphery of said disc-like magnetic pole pieces 16, 17, and a center pole piece 21 opposed to said S pole on the periphery thereof, and wherein each of said stators assumes a U-shape with the pulser coil 20 being wound on said center pole piece 21.

7. An ignition signal generator for internal combustion engines according to claim 1, wherein said first stepped portions 16C, 17C are overlapped in the axial direction over a distance l maintaining a relation l≦L, wherein L denotes the length of the center part 21 of the core 19 protruded in the axial direction.

8. An ignition signal generator for internal combustion engines according to claim 5, wherein said disc-like magnetic pole pieces 16, 17 have second stepped portions 16D, 17LD that overlap in the axial direction over a length l′ maintaining a relation l′≧L′, wherein L′ denotes the gap between said center pole piece 21 and either one of the pole piece 19B or 19C of said E-shaped stator 12.

9. An ignition signal generator for internal combustion engines according to claim 6, wherein said disc-like magnetic pole pieces 16, 17 have second stepped portions 16D, 17D that overlap in the axial direction over a length l′ maintaining a relation l′≧L′, wherein L′ denotes the gap between said center pole piece 21 and the pole piece (19B or 19C) of said U-shaped stator 12.

* * * * *